3,646,101
BORONATES AND BORINATES

Henryk A. Cyba, Evanston, Ill., assignor to Universal Oil Products Company, Des Plaines, Ill.
No Drawing. Continuation-in-part of application Ser. No. 702,835, Feb. 5, 1968, which is a continuation-in-part of application Ser. No. 367,854, May 15, 1964, now Patent No. 3,382,208. This application Mar. 9, 1970, Ser. No. 17,861

Int. Cl. C07f 5/04
U.S. Cl. 260—462 R
4 Claims

ABSTRACT OF THE DISCLOSURE

Boronates and borinates of N,N-di-cycloalkylalkanolamine in which the alkanolamine moiety contains from 2 to 8 carbon atoms. These boronates and borinates are useful as weathering stabilizers in plastics, as additives in petroleum products and as bactericides.

CROSS REFERENCE TO RELATED APPLICATIONS

This is a continuation-in-part of application Ser. No. 702,835 filed Feb. 5, 1968, now abandoned, which in turn is a continuation-in-part of application Ser. No. 367,854 filed May 15, 1964 (now U.S. Pat. No. 3,382,208).

BACKGROUND OF THE INVENTION

In parent application Ser. No. 702,835 filed Feb. 5, 1968 and application Ser. No. 367,854 filed May 15, 1964, now U.S. Pat. No. 3,382,208, various boron derivatives of N,N-di-cycloalkyl-alkanolamines have been shown to be especially effective weathering agents for solid polymers and to possess other desirable additives properties.

DESCRIPTION OF THE INVENTION

Among the boron derivatives included in the above named applications are the boronate and borinate of N,N-dicycloalkyl-alkanolamines, in which the alkanolamine moiety contains from 2 to 8 carbon atoms. These boronates and borinates are believed to be new composition of matter and the present application is being filed to so claim them.

In one embodiment the present invention relates to a boronate of N,N-di-cycloalkyl-alkanolamine in which the alkanolamine moiety contains from 2 to 8 carbon atoms.

In another embodiment, the present invention relates to a borinate of N,N-di-cycloalkyl-alkanolamine in which the alkanolamine moiety contains from 2 to 8 carbon atoms.

The boronates and borinates of the present invention may be illustrated by the following formula:

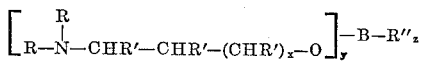

where R is cycloalkyl, R' is hydrogen, alkyl, cycloalkyl or aryl, R" is alkyl, cycloalkyl or aryl, $x$ is 0 to 6, $y$ is 1 or 2 and $z$ is 1 or 2, the sum of $y$ and $z$ being equal to 3.

Where $y$ is 2 and $z$ is 1, the compound of the present invention is a boronate, where $y$ is 1 and $z$ is 2, the compound of the present invention is a borinate.

As hereinbefore set forth, R is cycloalkyl containing from 4 to 12 and still more preferably from 5 to 8 carbon atoms in the cyclic structure. When R' is alkyl, it contains from 1 to 10 carbon atoms and still more preferably from 1 to 6 carbon atoms. When R' is cycloalkyl, it contains from 4 to 12 and still more preferably from 5 to 8 carbon atoms in the cyclic structure. When R or R' is aryl, it may be phenyl, naphthyl or anthracyl. When R" is alkyl, it may contain from 1 to 40 and still more preferably from 1 to 20 carbon atoms. When R" is cycloalkyl or aryl, it preferably is the same as described above for R or R'. It is understood that when R, R' or R" is cycloalkyl or aryl, the cyclic nucleus may contain 1 or more alkyl substituents attached thereto, the alkyl substituents containing from 1 to 20 and preferably from 1 to 6 carbon atoms each.

Particularly preferred boronates and borinates are illustrated by the following formula:

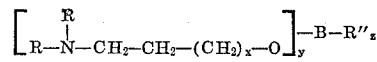

where R is cycloalkyl having from 4 to 12 carbon atoms in the cyclic structure, R" is alkyl of from 1 to 20 carbon atoms, $x$ is 0 to 6, $y$ is 1 or 2 and $z$ is 1 or 2, the sum of $y$ and $z$ being equal to 3.

As hereinbefore set forth, the novel compound of the present invention is a boronate or borinate of a particularly substituted alkanolamine containing from 2 to 8 carbon atoms in the alkanolamine moiety. A preferred alkanolamine in this embodiment is N,N-dicyclohexyl-ethanolamine. Other compounds include N,N-di-cyclobutyl-ethanolamine,
N,N-di-cyclopentyl-ethanolamine,
N,N-di-cycloheptyl-ethanolamine,
N,N-di-cyclooctyl-ethanolamine,
N,N-di-cyclononyl-ethanolamine,
N,N-di-cyclodecyl-ethanolamine,
N,N-di-cycloundecyl-ethanolamine,
N,N-di-cyclododecyl-ethanolamine,
N,N-di-cyclobutyl-propanolamine,
N,N-di-cyclopentyl-propanolamine,
N,N-di-cyclohexyl-propanolamine,
N,N-di-cycloheptyl-propanolamine,
N,N-di-cyclooctyl-propanolamine,
N,N-di-cyclononyl-propanolamine,
N,N-di-cyclodecyl-propanolamine,
N,N-di--cycloundecyl-propanolamine,
N,N-di-cyclododecyl-propanolamine,
N,N-di-cyclobutyl-butanolamine,
N,N-di-cyclopentyl-butanolamine,
N,N-di-cyclohexyl-butanolamine,
N,N-di-cycloheptyl-butanolamine,
N,N-di-cyclooctyl-butanolamine,
N,N-di-cyclononyl-butanolamine,
N,N-di-cyclodecyl-butanolamine,
N,N-di-cycloundecyl-butanolamine,
N,N-di-cyclododecyl-butanolamine,
N,N-di-cyclobutyl-pentanolamine,
N,N-di-cyclopentyl-pentanolamine,
N,N-di-cyclohexyl-pentanolamine,
N,N-di-cycloheptyl-pentanolamine,
N,N-di-cyclooctyl-pentanolamine,
N,N-di-cyclononyl-pentanolamine,
N,N-di-cyclodecyl-pentanolamine,
N,N-di-cycloundecyl-pentanolamine,
N,N-di-cyclododecyl-pentanolamine,
N,N-di-cyclobutyl-hexanolamine,
N,N-di-cyclopentyl-hexanolamine,
N,N-di-cyclohexyl-hexanolamine,
N,N-di-cycloheptyl-hexanolamine,
N,N-di-cyclooctyl-hexanolamine,
N,N-di-cyclononyl-hexanolamine,
N,N-di-cyclodecyl-hexanolamine,
N,N-di-cycloundecyl-hexanolamine,
N,N-di-cyclododecyl-hexanolamine,
N,N-di-cyclobutyl-heptanolamine,
N,N-di-cyclopentylheptanolamine,
N,N-di-cyclohexyl-heptanolamine,
N,N-di-cycloheptyl-heptanolamine,
N,N-di-cyclooctyl-heptanolamine,
N,N-di-cyclononyl-heptanolamine, N,N-di-cyclodecyl-heptanolamine,
N,N-di-cycloundecyl-heptanolamine,
N,N-di-cyclododecyl-heptanolamine,
N,N-di-cyclobutyl-octanolamine,
N,N-di-cyclopentyl-octanolamine,
N,N-di-cyclohexyl-octanolamine,
N,N-di-cycloheptyl-octanolamine,
N,N-di-cyclooctyl-octanolamine,
N,N-di-cyclononyl-octanolamine,
N,N-di-cyclodecyl-octanolamine,
N,N-di-cycloundecyl-octanolamine,
N,N-di-cyclododecyl-octanolamine, etc.

The N,N-di-cycloalkyl-alkanolamine for use in the present invention may be obtained from any suitable source. Some of these particularly substituted alkanolamines are available in the open market or they may be prepared in any suitable manner. In one method, the alkanolamine is subjected to reductive alkylation with a cycloalkyl ketone. For example, N,N-di-cyclohexyl-ethanolamine is prepared by the reductive alkylation of ethanolamine with cyclohexanone, similarly N,N-di-cyclooctyl-propanolamine is prepared by the reductive alkylation of propanolamine with cyclooctanone. Also, for example, N,N-di-cyclopentyl-hexanolamine is prepared by the reductive alkylation of hexanolamine with cyclopentanone. It is understood that the ketone will be selected with regard to the particular N,N-di-substituted alkanolamine desired. The reductive alkylation is effected in the presence of hydrogen and a suitable reductive alkylation catalyst. Any suitable reductive alkylation catalyst is employed, including those containing nickel, platinum, palladium, etc., preferably composited with a suitable support. A particularly preferred catalyst comprises a composite of from about 0.1 to about 2% by weight of platinum with alumina, which may or may not contain from about 0.01% to about 1% by weight of fluorine and/or chlorine.. Another suitable catalyst comprises an intimate mixture of copper oxide, chromium oxide and barium oxide. When using the platinum catalyst, the temperature generally will be within the range of from about 100° to about 260° C. and a hydrogen pressure of from about 100 to about 3000 p.s.i. or more.

While the N,N-di-cycloalkyl-alkanolamine may be prepared by the reductive alkylation of the corresponding alkanolamine as hereinbefore set forth, in another and preferred method, the corresponding N,N-di-cycloalkyl-amine is subjected to oxyalkylenation by reaction with one mole proportion of ethylene oxide, propylene oxide, butylene oxide, amylene oxide or other desired alkylene oxide. This reaction is readily effected by charging the N,N-di-cycloalkyl-amine into a reaction zone and passing the alkylene oxide into contact with the amine. Preferably at least equal mole proportions of alkylene oxide and amine are employed, although an excess of one may be used to insure complete reaction. The reaction readily occurs at a low temperature which may range from room temperature to 150° C. in the presence of a catalyst as required.

It is an essential requirement of the present invention that the alkanolamine contains from 2 to 8 carbon atoms and is an N,N-di-cycloalkyl-alkanolamine. In another embodiment, the substituted alkanolamine may contain one cycloalkyl group and one secalkyl group as, for example, in compounds as N-cyclohexyl-N-isopropyl-ethanolamine, N-cyclobutyl-N-secbutyl-butanolamine, N-cyclopentyl-N-secpentyl-pentanolamine, N-cycloheptyl-N-sec-heptyl-heptanolamine, N-cyclooctyl-N-secoctyl-octanolamine, N-cyclohexyl-N-secoctyl-ethanolamine, N-cyclohexyl-N-secbutyl-propanolamine, etc.

The boronate and borinate of the present invention are prepared in any suitable manner. Any suitable borylating agent may be used. When preparing the boronate, the borylating agent includes alkyl boric acid, cycloalkyl boric acid or aryl boric acid, or substitution products of these with alkoxy, alkyl and/or halo groups. These more properly are named as boronic acid and will have the formula:

$$(HO)_2\text{---}B\text{---}R''$$

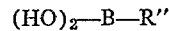

where R'' has the designation hereinbefore set forth. Other borylating agents include dialkyl boronates (formula of $(RO)_2\text{---}B\text{---}R''$) in which R is alkyl and preferably contains from 1 to 4 carbon atoms each. In the use of the latter type borylating agent, the reaction is effected by transesterification and, accordingly, there is no advantage to using dialkyl boronates containing more than 4 carbon atoms in each alkyl group, although the higher boiling dialkyl boronates may be used when satisfactory and advantages appear therefor.

When preparing the borinate, the borylating agents include dialkyl boric acid, dicycloalkyl boric acid and diaryl boric acid, substitution products of these with alkoxy, alkyl and/or halo groups. These more properly are named as borinic acids and have the formula:

$$HO\text{---}B\text{---}R''_2$$

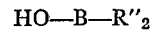

where R'' has the designation hereinbefore set forth. Here again the corresponding alkyl boronates (formula of $RO\text{---}B\text{---}R''_2$), in which R is alkyl and preferably contains from 1 to 4 carbon atoms, may be used in order to effect the reaction by transesterification.

The reaction of borylating agent and alkanolamine is effected in any suitable manner. This conveniently is effected by heating and stirring the reactants at a temperature up to about 100° C. and thus within the range of from about 60° to about 100° C. when using boronic or borinic acid. However, when employing dialkyl boronates or alkyl borinates in order to effect transesterification reaction, a higher temperature is used which may be within the range of from 100° to about 200° C. In one method the reactants are refluxed in the presence of a solvent. Any suitable solvent may be used and advantageously comprises an aromatic hydrocarbon solvent including benzene, toluene, xylene, ethylbenzene, cumene, etc., or mixtures thereof. Also, n-hexane, n-heptane, n-octane, n-decane, n-dodecane and chlorinated hydrocarbons may be used. In fact, any water azeotropic solvent which is non-reactive with boric acid or alkanolamine may be used. The use of a solvent is particularly preferred when boronic or borinic acid is used as the borylating agent. When using a dialkyl boronate or alkyl borinate as the borylating agent, the solvent may be omitted. While no catalyst normally is required, a catalyst may be used when employing the dialkyl boronate or alkyl borinate. Any suitable catalyst may be employed including sodium hydrogen sulfate, potassium hydrogen sulfate, tin oxide, polyalkyl tin derivatives, alkoxy tin derivatives, polyalkyl titanium derivatives, alkoxy titanium derivatives, trialkyl or trialkoxy aluminum, etc.

When preparing the boronate, the borylating agent and alkanolamine are used in a mole proportion of 0.5 mole proportion of borylating agent per 1 mole proportion of alkanolamine. When preparing the borinate, the borylating agent and alkanolamine are used in an equal mole proportion. It is understood that a slight excess of one of the reactants may be used in order to insure complete reaction.

As hereinbefore set forth, the reaction is readily effected by heating and refluxing the borylating agent and alkanolamine, with or without solvent and/or catalyst as required. Refluxing is continued until the required amount of water when using boronic acid or borinic acid or of alcohol when using the dialkyl boronate or alkyl borinate is collected. Following completion of the reaction, the solvent and alcohol, if any, are removed by vacuum distillation. The borylated alkanolamine may be recovered as such or, when desired, the product may be retained in the solvent and may be used as such, or the product may be prepared as a solution in a different solvent and used in this manner.

The boronates or borinates of the present invention will have varied utilities. In one embodiment, these are used for improving the weathering properties of solid organic substrates. Although the mechanism in which these compounds function is not completely understood, these compounds serve to protect substrates which undergo ultraviolet light induced oxidation. In addition, these compounds possess anti-static properties and adhesion improving properties. In addition, the compounds are effective as antioxidants and peroxide decomposers, combustion improvers and bactericides, especially for petroleum products. Also they may serve as dye sites in plastics. Furthermore they are of ready solubility in most substrates. The substrates normally subject to exposure to weather include plastic. In addition, the additives of the the present invention may be used in paints varnishes and other coatings.

Illustrative plastics which are stabilized by the novel compounds of the present invention include polymers of monoolefins such as polyethylene, polypropylene, polybutylene, mixed ethylene propylene polymers, mixed ethylene butylene polymers, mixed propylene butylene polymers, mixed styrene ethylene polymers, mixed styrene propylene polymers, etc. The solid olefin polymers are used in many applications including electrical insulation, light weight outdoor furniture, awnings, cover for greenhouses, etc. In many of these applications the solid olefin polymer is exposed to sunlight and air.

In another embodiment the polymers include those prepared from diolefinic monomers as, for example, polybutadiene, or those in which the diolefin or diolefins are reacted with monoolefin or monoolefins as, for example, ABS (acrylo-nitrile-butadiene-styrene polymers).

Another plastic being used commercially on a large scale is polystyrene. The polystyrenes are particularly useful in the manufacture of molded or machined articles which find application in such goods as windows, optical goods, automobile panels, molded household articles, etc. One disadvantage of polystyrene is its tendency to deteriorate when exposed to direct sunlight and air for extended periods of time.

Another class of plastics available commercially is broadly classed as vinyl resins and is derived from monomers such as vinyl chloride, vinyl acetate, vinylidine chloride, etc. Polyvinyl chloride plastics are available commercially on a large scale and undergo deterioration when exposed to sunlight. Other vinyl type resins include copolymers of vinyl chloride with acrylonitrile, methacrylonitrile, vinylidine chloride, alkyl acrylates, alkyl methacrylates, alkyl maleates, alkyl fumarates, polyvinyl butyral, etc., or mixtures thereof.

Other plastics being used commercially on a large scale are in the textile class and include nylon (polyamide), Perlon L or 6-nylon (polyamide), Dacron (terephthalic acid and ethylene glycol), Orlon (polyacrylonitrile), Dynel (copolymer of acrylonitrile and vinyl chloride), Acrilan (polyacrylonitrile modified with vinyl acetate), Saran (copolymer of vinylidine chloride and vinyl chloride), rayon, etc. Here again, deterioration occurs due to ultraviolet light and oxidation.

Still other plastics are prepared from other monomers and are available commercially. Illustrative examples of such other solid polymers include polycarbonates, phenol-formaldehyde resins, urea-formaldehyde resins, melamine-formaldehyde resins, acryloid plastics which are derived from methyl, ethyl and higher alkyl acrylates and methacrylates as monomers used in the polymerization. Other polymers include polyacetals especially polyformaldehydes such as "Delrin" and "Celcon." Still other substrates include vinyl, acrylic, nitrocellulose based coatings; especially cellulose acetate, cellulose acetate butyrate, ethyl cellulose, etc. Still other substrates are polyesters, including linear or cross-linked, reinforced polyesters, laminate polyesters, etc., polyurethanes, epoxy resins, various latexes, lacquers, alkyds, varnishes, polishes, stains, pigments, dyes, textile finishing formulations, etc.

It is understood that the plastic may be fabricated into any desired finished product including moldings, castings, fibers, films, sheets, rods, tubing or other shapes.

Rubber is composed of polymers of conjugated 1,3-dienes, either as polymers thereof or as copolymers thereof with other polymerizable compounds, and the rubbers, both natural and synthetic, are included as solid polymers in the present specifications and claims. Synthetic rubbers include SBR rubber (copolymer of butadiene and styrene), EPR rubber, a terpolymer of ethylene, propylene and a diene, Buna A (co-polymer of butadiene and acrylonitrile), butyl rubber (co-polymer of butadiene and isobutylene), neoprene rubber (chloroprene polymer), Thiokol rubber (polysulfide), silicone rubber, etc. The natural rubbers include heavea rubber, cautchouc, balata, gutta percha, etc. It is well known that rubber undergoes deterioration due to oxygen and, when exposed to direct sunlight for extended periods of time, also undergoes deterioration from this source.

The above are illustrative examples of various solid polymers, plastics and resins which are improved by the additives of the present invention. As hereinbefore set forth, still other substrates include paints, varnishes, drying oils, pigments, rust preventative coatings, wax coatings, protective coatings, etc. It is understood that the compounds of the present invention may be used in any coating which is subject to exposure to ultraviolet light, oxidation, heat, etc. While the compounds are especially useful in materials subject to such exposure, it is understood that the compounds of the present invention also may be used advantageously in other coatings, plastics, paints, etc., which normally are not exposed outdoors.

In many applications it is advantageous to utilize the compounds of the present invention in conjunction with other additives. For example, particularly improved results are obtained in the stabilization of plastics or resins, apparently due to a synergistic effect, when the compound of the present invention is used in admixture with a phenolic antioxidant including particularly 2,6-ditertiary-butyl-4-methylphenol or higher molecular weight derivatives such as 2,6-dilauryl-4-alkylphenol, etc. Other inhibitors which may be used generally will be of the phenolic or amine type and include phenyl-alpha-naphthylamine, phenyl-beta-naphthylamine, phenothiazine, Nonox WSP, Nonox Cl, dialkylated phenols, trialkylated phenols including 2,4-dimethyl-6-tertiarybutylphenol, etc., Santonox R, Santowhite, alkyl-alkoxyphenols, 2246 [2,2'-methylene-bis(4-methyl - 6 - tert-butylphenol)] and 425 [2,2'-methylene-bis - (4-ethyl-6-tert-butylphenol)], diphenyl-p-phenylenediamine, 1,1,3-tris-(2-methyl - 4 - hydroxy-5-t-butylphenyl)-butane, 703 (2,6-di-tert-butyl-alpha-dimethylamino-p-cresol), 4,4'-bis-(2-methyl-6-tert-butylphenol), 4,4'-thio-bis-(6 - tert-butyl-o-cresol), 4,4'-bis-(2,6-di-tert-butylphenol), 4,4'-methylene - bis - (2,6-di-tert-butylphenol), various Irganoxes, various Ionoxes such as 1,3,5-trimethyl-2,4,6-tris-(3,5 - di-tert-butyl - 4 - hydroxybenzyl)-benzene, etc., various Plastonoxes such as 2,6-bis-(2'-hydroxy-3'-tert-butyl-5'-methylbenzyl)-4-methylphenol, etc., Salol (salicyclic acid esters), p-octylphenylsalicylate, various phosgene alkylated phenol reaction products, various alkoxyalkyldihydroxybenzophenones, polyalkyldihydroxybenzophenones, tetrahydroxybenzophenones, 2,4,5-trihydroxybutyrophenone and especially such hydroxybenzophenones as 2,2'-dihydroxy-4-octoxybenzophenone, 2,2'-dihydroxy - 4 - decoxybenzophenone, 2,2'-dihydroxy-4-dodecoxybenzophenone, 2,2'-dihydroxy-4-octadecoxybenzophenone, etc., in general any alkoxy or cycloalkoxy substituted 2,2'-dihydroxybenzophenone, 2-hydroxy - 4' - octoxybenzophenone, 2-hydroxy-4'-decoxybenzophenone, 2-hydroxy-4'-dodecoxybenzophenone, etc., and in general any alkoxy or cycloalkoxy substituted 2-hydroxybenzophenone. Other ultraviolet light stabilizers include nickel-bis-dithiocarbamates, nickel-bis-dihydroxypolyalkylphenol sulfides, especially [2,2'-thiobis-(4-t-octylphenolato)]-n- butylamine nickel (II), dilauryl betamercaptodipropionate, dihydroxytetralkyl sulfides, di-hydroxytetraalkyl methanes, various trithiophosphites as trilaurylthiophosphite, dialkylphosphites, trialkylphosphites, high molecular weight nitriles, various Mannich bases, various N-hydroxyphenylbenzotriazoles such as 2-(2'-hydroxy-5'-octylphenyl)-benzotriazole, 2 - (2-hydroxy-5'-dodecylphenyl)-benzotriazole, 2 - (2'-hydroxy-5'-octoxyphenyl)benzotriazole, 2-(2'-hydroxy-3'-tert-butyl-5'-methyl)-benzotriazole, 2-(2'-hydroxy-5'-dodecoxyphenyl)-benzotriazole, Tinuvin 326, Tinuvin 327, Tinuvin P, etc., in general, any alkyl or alkoxyphenyl substituted benzotriazole, etc. The additional inhibitor may be used in a concentration of from about 1% to about 75% by weight of the compound of the present invention. Generally, the additional inhibitor will be used in a concentration within the range of from about 0.001% to about 3% and more particularly from about 0.01% to about 2% by weight of the substrate.

The additive of the present invention will be used in a stabilizing concentration which will depend upon the particular substrate. The additive may be used in a concentration as low as 0.0001% to as high as 25% but generally will be used in a concentration of from 0.01% to about 5% by weight of the substrate. The additive is incorporated in the substrate in any suitable manner. Incorporation into a solid plastic is readily obtained by adding the additive to the hot melt with stirring, generally in a Banbury mixer, extruder or other device. When added to paint, the additive is incorporated into the paint with intimate stirring.

The additive of the present invention may be utilized as such or prepared as a solution in a suitable solvent including alcohols and particularly methanol, ethanol, propanol, butanol, etc., hydrocarbons and particularly benzene, toluene, xylene, cumene, Decalin, etc.

The following examples are introduced to illustrate further the novelty and utility of the present invention but not with the intention of unduly limiting the same.

EXAMPLE I

The additive of this example was prepared by the reaction of N,N-di-cyclohexyl-ethanolamine and nonyl boronic acid, which previously was named nonyl boric acid and has the formula of:

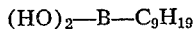
$$(HO)_2—B—C_9H_{19}$$

Specifically, 22.5 g. (0.1 mole) of N,N-di-cyclohexyl-ethanolamine and 8.59 g. (0.05 mole) of nonyl boronic acid were heated and refluxed in the presence of 50 g. of benzene. A total of 1.4 cc. of water was collected. The product was vacuum distilled at a temperature of 115° C. and 18 mm. Hg. The product is believed to be the N,N-di-cyclohexyl-amino ethyloxydiester of nonyl boronic acid. 1.71% by weight of boron was found on analysis.

EXAMPLE II

The compound of this example is the borinate prepared by the reaction of equal mole proportions of N,N-di-cyclohexyl-ethanolamine and dinonyl borinic acid. The dinonyl borinic acid has the formula:

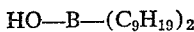
$$HO—B—(C_9H_{19})_2$$

Here again the reaction is effected by heating and refluxing 0.1 moles of N,N-di-cyclohexyl-ethanolamine and 0.1 mole of dinonyl borinic acid in the presence of 70 g. of benzene. The heating and refluxing is continued until the required amount of water is collected, after which the reaction product is subjected to vacuum distillation to remove the benzene solvent and to recover the N,N-di-cyclohexyl-ethoxymonoester of dinonyl borinic acid.

EXAMPLE III

The compound of this example is the boronate of N,N-di-cyclohexyl-propanolamine and octyl boronic acid. The reaction is effected by heating and refluxing 1 mole proportion of N,N-di-cyclohexyl-propanolamine and 0.5 mole proportion of octyl boronic acid. The heating and refluxing is effected in the presence of benzene solvent and is continued until the required amount of water is recovered. Following completion of the reaction, the reaction mixture is subjected to vacuum distillation to remove the benzene solvent and to recover the product which has the formula:

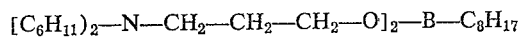
$$[C_6H_{11})_2—N—CH_2—CH_2—CH_2—O]_2—B—C_8H_{17}$$

EXAMPLE IV

The corresponding borinate is prepared in a similar manner by reacting equal mole proportions of N,N-di-cyclohexyl-propanolamine and dioctyl borinic acid, the latter having the formula: $H—O—B—(C_8H_{17})_2$. Here again the reaction is effected by heating and refluxing equal mole proportions of the reactants in the presence of benzene solvent. After completion of the reaction and the removal of the benzene solvent by vacuum distillation, the product is recovered as being of the following formula:

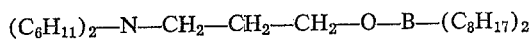
$$(C_6H_{11})_2—N—CH_2—CH_2—CH_2—O—B—(C_8H_{17})_2$$

EXAMPLE V

The compound of this example is the boronate prepared by heating and refluxing one mole proportion of cyclooctyl butanolamine with 0.5 mole proportions of dodecyl boronic acid. The heating and refluxing is effected in the presence of toluene solvent and is continued until the required amount of water is recovered. In this preparation the product is recovered in admixture with the solvent remaining after the reaction and is used in this manner as an additive.

EXAMPLE VI

The borinate of this example is prepared by reacting equal mole proportions of N,N-di-cyclopentyl-hexanolamine and dodecyl borinic acid. The reaction is effected in toluene solvent and is continued until the required amount of water is recovered. Following completion of the reaction, the product is recovered in admixture with the toluene solvent remaining after completion of the reaction.

EXAMPLE VII

The boronate of N,N-di-cyclohexyl-ethanolamine and nonyl boronic acid, prepared as described in Example I, is used as a weathering agent in plastics. The plastic of this example is solid polypropylene. The solid polypropylene without inhibitor is stated to have properties substantially as follows:

TABLE I

| | |
|---|---|
| Specific gravity | 0.910–0.920 |
| Refractive index, $n_D^{25}$ | 1.510 |
| Heat distortion temperature: | |
| At 66 p.s.i. load, ° C. | 116 |
| At 264 p.s.i. load, ° C. | 66 |
| Tensile yield strength, (ASTM D–638–58T) (0.2" per min.) p.s.i. | 4700 |
| Total elongation, percent | 300–400 |
| Stiffness, flexural (ASTM D747–50) $10^5$ p.s.i. | 1.8 |
| Shore hardness (ASTM D676–55T) | 74D |

The polypropylene was milled in a two-roll heated mill of conventional commercial design and the additive, when employed, was incorporated in the sample during the milling. The samples were pressed into sheets of about 17 mil. thickness and cut into plaque of about 1⅜" x 1½". The plaques were inserted into plastic holders, affixed onto a rotating drum and exposed to carbon arc rays at about 52° C. in a Weather-Ometer. The samples were examined periodically by infrared analysis to determine the carbonyl band at 1715 cm.$^{-1}$ which is reported as the "carbonyl number." The higher intensity of the carbonyl band indicates a higher carbonyl concentration (expressed as carbonyl number) and accordingly increased deterioration.

A sample of the polypropylene without inhibitor developed a carbonyl number of greater than 1000 within 120 hours of exposure in the Weather-Ometer. Another sample of the same polypropylene containing 1% by weight of the boronate of N,N-di-cyclohexyl-ethanolamine and nonyl boronic acid, prepared as described in Example I, will not develop a carbonyl number of greater than 1,000 for a considerably longer time of exposure in the Weather-Ometer.

EXAMPLE VIII

As hereinbefore set forth, advantages appear in the use of the boronate or borinate of the present invention in conjunction with a phenolic antioxidant. In this example, 1% by weight of the boronate of N,N-di-cyclohexyl-ethanolamine and nonyl boronic acid, prepared as described in Example I, is used in admixture with 0.15% by weight of 2,6-di-tertiarybutyl-4-methylphenol. This mixture is incorporated in another sample of the polypropylene described in Example VII and is evaluated in the Weather-Ometer in the same manner. The sample of polypropylene will not reach a carbonyl number of greater than 1,000 for more than 2,000 hours.

EXAMPLE IX

The boronate of N,N-di-cyclohexyl-ethanolamine and nonyl boronic acid, prepared as described in Example I, in admixture with 0.15% by weight of 2,6-di-tertiarybutyl-4-methylphenol, was evaluated in another solid polypropylene by outdoor testing. In this evaluation, control sample of polypropylene (not containing the additive) and sample of the polypropylene containing the additive mixture described above were prepared as plaques and exposed outdoors in Des Plaines, Illinois, at an angle of 45°. The control sample dropped from an original yield of over 4,000 p.s.i. to 2,000 p.s.i. within 56 days and was brittle within another 28 days of outdoor exposure. In contrast, sample of the polypropylene containing the additive of this example still had a yield value of 4230 p.s.i. after 426 days of outdoor exposure.

EXAMPLE X

The borinate of N,N-di-cyclohexyl-ethanolamine and dinonyl borinic acid, prepared as described in Example II, is used as a weathering agent in solid polyethylene of the high density type. An inhibited product of this polyethylene is marketed commercially under the trade name of "Fortiflex." A special batch of this polyethylene free of inhibitor is obtained and is cut into plaques in the same manner described in Example VII and evaluated in the Weather-Ometer. A sample of this polyethylene without inhibitor, when evaluated in the Weather-Ometer, increases from a carbonyl number of 28 to a carbonyl number of 855 within 624 hours. In contrast, another sample of the polyethylene containing 1% by weight of the additive prepared as described in Example II does not develop a carbonyl number of above 800 for a considerably longer period of time.

EXAMPLE XI

The boronate of N,N-cyclohexyl-propanolamine and octyl boronic acid, prepared as described in Example III, is incorporated in a concentration of 1% by weight in polystyrene and serves to inhibit deterioration of the polystyrene upon exposure to weathering.

I claim as my invention:

1. A boronate or borinate of the following formula:

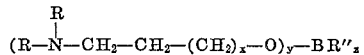

where R is cycloalkyl having from 4 to 12 carbon atoms in the cyclic structure, R" is alkyl of from 1 to 20 carbon atoms, $x$ is 0 to 6, $y$ is 1 or 2 and $z$ is 1 or 2, the sum of $y$ and $z$ being equal to 3.

2. The compound of claim 1 where R is cyclohexyl.

3. The compound of claim 1 where $x$ is 0, $y$ is 2 and $z$ is 1.

4. The compound of claim 1 where $x$ is 0, $y$ is 1 and $z$ is 2.

References Cited

UNITED STATES PATENTS 3,350,316 10/1967 Berger et al. _____ 260—462 X
2,970,130 1/1961 Finestone _____ 260—462 X LEON ZITVER, Primary Examiner L. DE CRESCENTE, Assistant Examiner U.S. Cl. X.R.

106—15; 117—236; 260—45.7 R, 45.75 R, 45.8 R, 45.85 R, 45.9 R, 45.95, 814